March 23, 1943.        J. J. DUFFY        2,314,612
WINDMILL
Filed July 1, 1941

Inventor:
John J. Duffy,
by _____
Attorney

Patented Mar. 23, 1943

2,314,612

UNITED STATES PATENT OFFICE 2,314,612

WINDMILL

John J. Duffy, Tacoma, Wash.

Application July 1, 1941, Serial No. 400,630

2 Claims. (Cl. 170—27)

This invention relates to prime movers and especially to those adapted to be driven by the wind though, with some modifications my mechanism may be used as a water motor.

The objects of my invention are, first, to improve the form of the wind vanes whereby, when traveling with the wind, they are in the most efficient form to receive the wind pressure; second, and when they are traveling against the wind, on the return or idle stroke, they are of the most efficient form to slide through the wind with the least resistance therefrom; third, to provide means for insuring their opening when passing from said idle to said working form as they change their relative direction of motion in relation to the wind; and fourth, to provide means for maintaining the wind mill across the direction of the wind and to compensate for the resistance torque applied thereto by the driven shaft.

I attain these and other objects by the devices and arrangements illustrated in the accompanying drawing, in which—

Figure 1:
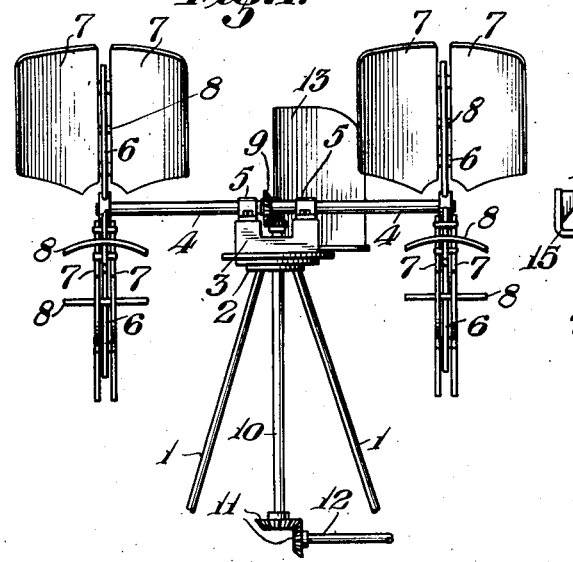
Figure 2:
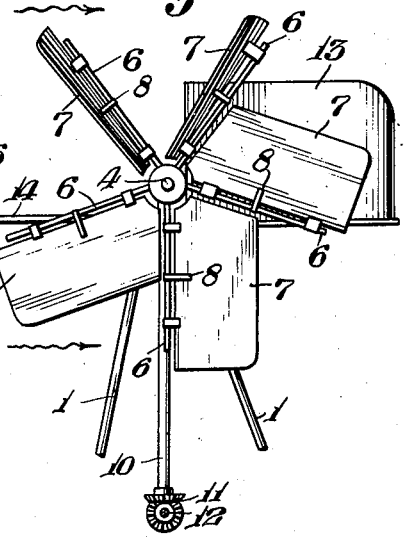
Figure 3:
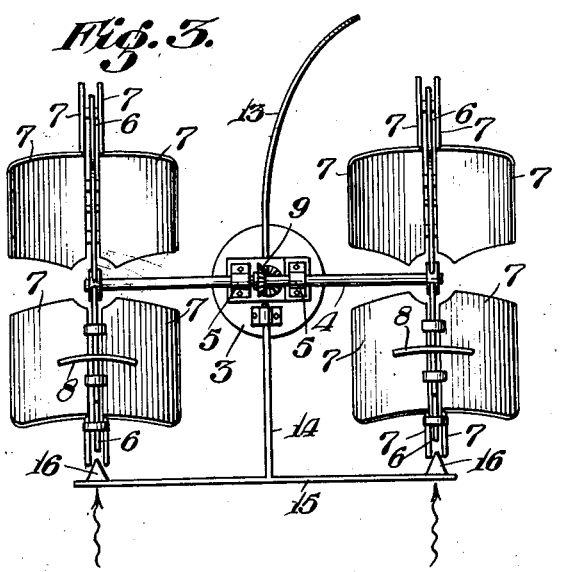
Figure 4:
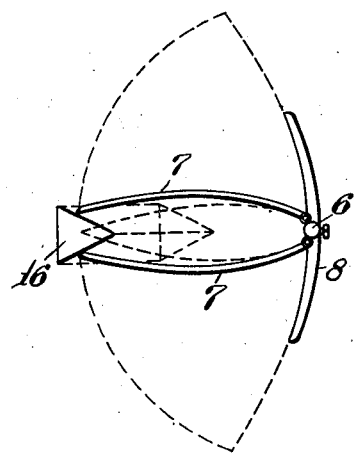
Figure 5:
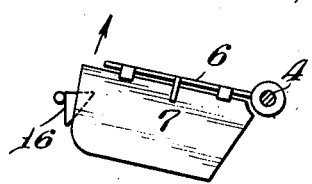

Fig. 1 is a front elevation of my improved wind mill looking down-wind; Fig. 2 is a side elevation thereof; Fig. 3 is a plan view thereof; Fig. 4 is an end view of a pair of the vanes showing them in partly opened position when changing their direction of motion in relation to the wind, and showing them in closed and opened positions in broken lines; and Fig. 5 is a side elevation of a pair of vanes in closed position and engaging the automatic opening device.

Similar numerals of reference refer to similar parts throughout the several views.

Two facts have been taught us by aeronautical science in relation to the reaction of the wind on a surface, namely, first, that when an object is cup-shaped and placed athwart or across the course of the wind, it has a much greater resistance to the wind than when it is flat; and second, when an object is "stream-lined" it has a less resistance to the wind passing it than when flat. The facts have been utilized in the following described invention, in order to give it the greatest efficiency of operation.

The wind mill frame is indicated by the legs or posts 1 supporting, at their upper end, a horizontal base plate 2, on which is rotatably mounted the carrier frame 3. A cross-shaft 4 is mounted in suitable bearings 5 on the carrier frame 3, said shaft extending laterally across the wind. A series of arms 6 radiate from each of the ends of the shaft 4. A pair of wind vanes 7 are hingedly secured to each of said radiating arms 6, said vanes being adapted to move from closed position to open position under the influence of the wind. The vanes 7 are made of stiff material and are preferably bent so as to form a cup-shaped or concaved surface when they are open, and so as to form a stream-lined surface when closed (Fig. 4).

A suitable stop or brace 8 is fastened to each of the arms 6, said brace extending laterally therefrom and being preferably curved to fit the backs of said vanes 7 when they are opened out.

The shaft 4 is provided with a suitable gear 9, meshing with a gear on the vertical transmission shaft 10. This shaft 10 is suitably mounted in the mill frame 1 and may be connected at its lower end to the machinery being operated by this wind mill by any desired means, such as the gears 11 and the shaft 12.

The shaft 4 is kept athwart or across the course of the wind by means of a tail 13 which is preferably bent slightly at its trailing edge to provide a lateral leverage thereon to compensate for the reaction torque of the work being performed by the shaft 12. This reaction is caused by the resistance of the work being performed by the shaft 12 and is carried back thereby through the gears 11 and 9 and shafts 10 and 4, and tends to throw the shaft 4 out of its correct position at right-angles to the direction of the wind, and this tendency is countered by the lateral force on the tail 13 acting at the long leverage of said tail.

An arm 14 extends from the carrier frame 3, at right angles to the shaft 4, and carries a cross arm 15 at its end, said cross arm 15 extending on the windward side of both sets of vanes as they rotate. A wedge-shaped opener 16 is carried at each end of the cross arm 15, said openers 16 each lying in paths of the outer edges of the vanes 7 (Figs. 4 and 5), its pointed end entering the space between the curved sides of the vanes and traveling relatively outward therefrom as the vanes pass the wedge, thus forcing the trailing edges thereof apart, to expose their inner surface to the wind as they reach the position above the level of the center of rotation, on the windward side.

Thus it will be seen that my improved windmill is provided with a series of cup-shaped vanes, adapted to be moved by the wind, on the working side of their path of rotation, and that these vanes close, under the action of the wind thereon, as they pass downward to the idle side of their path of rotation, and that they expose the least resistance to the opposing stream of the wind by being of stream-lined shape on the said idle side of their path of rotation, and finally that, as they pass upward from said idle side to said working side, they are each successively opened by the fixed wedges to permit the wind to open them fully as they reach the working side of the path of rotation.

It is, of course, understood that many changes may be made in the details of the above-described wind mill, or in the method of transmitting its working energy to the machinery operated thereby, within the meaning of the claims appended hereto.

Having described my invention, what I claim and desire to secure by Letters Patent, is:

1. A wind mill comprising a supported rotatable carrier frame; a shaft supported thereon athwart the wind; a series of arms radiating from each end of said shaft; a pair of curved vanes hingedly secured to each of said arms, said vanes being concaved on the windward surface when opened apart to form a wind resistant surface, and forming a stream-lined surface when closed together; braces fixedly secured on each of said arms and adapted to engage said vanes when opened apart; a curved tail secured to said carrier frame and adapted to hold said shaft athwart the wind whereby a lateral force is provided to compensate for the reaction torque of the work performed by the wind mill; and means for transmitting the energy of said shaft.

2. A wind mill as set forth in claim 1, together with wedge means supported from said carrier frame and entering between said vanes when closed together, whereby the wind is admitted between said vanes to open them.

JOHN J. DUFFY.